US012665471B2

(12) United States Patent
Tietgen et al.

(10) Patent No.: US 12,665,471 B2
(45) Date of Patent: Jun. 23, 2026

(54) ELECTRIC DRIVE ASSEMBLY WITH COOLING

(71) Applicant: GKN Automotive Limited, Birmingham (GB)

(72) Inventors: Torsten Tietgen, Overath (DE); Simon Broicher, Hürth (DE)

(73) Assignee: GKN Automotive Limited, Birmingham (GB)

( * ) Notice: Subject to any disclaimer, the term of this patent is extended or adjusted under 35 U.S.C. 154(b) by 184 days.

(21) Appl. No.: 18/408,915

(22) Filed: Jan. 10, 2024

(65) Prior Publication Data

US 2024/0250582 A1     Jul. 25, 2024

(30) Foreign Application Priority Data

Jan. 19, 2023    (DE) ..................... 10 2023 101 253.3

(51) Int. Cl.
H02K 9/193       (2006.01)

(52) U.S. Cl.
CPC ......... H02K 9/193 (2013.01); H02K 2201/03 (2013.01)

(58) Field of Classification Search
CPC ................................. H02K 9/19; H02K 9/193
See application file for complete search history.

(56) References Cited

U.S. PATENT DOCUMENTS 11,005,326 B2     5/2021   Heien et al.

FOREIGN PATENT DOCUMENTS

| | | | |
|---|---|---|---|
| DE | 102019113091 A1 | 11/2020 | |
| WO | 2012086694 A1 | 6/2012 | |
| WO | WO-2019091351 A1 * | 5/2019 | ............... H02K 9/19 |
| WO | 2019184580 A1 | 10/2019 | |
| WO | 2020069744 A1 | 4/2020 | |

OTHER PUBLICATIONS

Tang (WO 2019091351 A1) English Translation (Year: 2019).*

* cited by examiner

*Primary Examiner* — Tulsidas C Patel
*Assistant Examiner* — Robert E Mates
(74) *Attorney, Agent, or Firm* — Reising Ethington P.C.

(57)         ABSTRACT

An electric drive assembly has a housing, an electric machine with a stator having a stator core and winding heads, a rotor being connected to a rotor shaft, a transmission rotationally drivable by the rotor shaft, and at least one fluid distribution element for supplying coolant to one of the winding heads. The fluid distribution element at least partially covers an upper part of the winding head in the circumferential direction and in the axial direction, and has a guide structure with a gradient in the circumferential direction. Coolant supplied to the fluid distribution element from above is distributed in the circumferential direction and runs onto the winding head in several angular positions over a circumferential area of at least 30° with respect to the axis of rotation.

17 Claims, 4 Drawing Sheets

ELECTRIC DRIVE ASSEMBLY WITH COOLING

CROSS-REFERENCE TO RELATED APPLICATIONS

This application claims priority to German Application No. DE 10 2023 101 253.3, filed on Jan. 19, 2023, which application is hereby incorporated herein by reference in its entirety.

BACKGROUND

Thermal behaviour is a key issue in connection with electric drives. Both the electric machine and the transmission generate heat, which must be dissipated in order to avoid unacceptably high temperatures and thus promote a long service life. The electric drive system must be able to withstand various driving conditions over the long term. This also applies to special driving situations, such as long inclines with operating angles typical of off-road vehicles and high-speed driving situations.

Supplying all the rotating components of a transmission with lubricant is often a challenge. A sufficient oil level must be set to ensure good lubrication and cooling of shafts, gears and bearings. At the same time, splash losses during operation are to be prevented.

WO 2012/086694 A1 discloses a drive unit comprising an electric machine, an inverter, a transmission assembly and a cooling system. A first housing element, which is thermally coupled to the inverter, has a first set of heat exchange surfaces, and a second housing element, which is thermally coupled to the electrical machine, has a second set of heat exchange surfaces. The first and second sets of heat exchange surfaces each extend into an internal volume that is cooled by a coolant. The transmission has a raised oil sump that is supplied by the same oil pump that circulates oil in the electrical machine, wherein the raised oil sump supplies oil to selected surfaces within the transmission by gravity.

WO 2020/069744 A1 discloses an electric drive for driving a motor vehicle, which has a housing assembly, an electric machine, a planetary unit and a power split unit. The housing assembly has a motor housing part, a transmission housing part and an intermediate housing part with an intermediate wall which spatially separates the motor chamber and the transmission chamber from one another. The intermediate housing part includes a motor-side jacket portion that extends into the motor housing part and a transmission side jacket portion that extends into the transmission housing part. A sealed cavity for a coolant flowing therethrough is formed between the outer surface of the motor-side jacket portion and the inner surface of the motor housing part.

An electric drive unit for driving a motor vehicle is known from U.S. Pat. No. 11,005,326 B2. The drive unit comprises a housing with a base section which divides the housing into an upper and a lower chamber. The base section has an elongated drain opening, drain holes and an oil supply opening connected to an oil pump. At the lower chamber there is an electrical machine with electrical cables arranged directly under the drain opening. A cover is attached to the housing at the upper chamber, which cover including a cooling channel arrangement that is integrally connected to a cover plate. The cooling channel arrangement forms a primary coolant channel that communicates with the oil supply opening and directs oil to the electrical terminals.

SUMMARY

The present disclosure relates to an electric drive assembly with an electric motor and transmission for driving a motor vehicle. The electric drive with the electric machine and transmission unit can provide reliable cooling of the stator even in a small installation space and thus can have a high efficiency and/or a long service life.

Accordingly, an electric drive for driving a motor vehicle is disclosed comprising a multi-part housing, an electric machine with a stator and a rotor, wherein the stator is accommodated in the housing in a rotationally fixed manner and includes a stator core and windings with winding heads that project axially beyond the stator core on both sides, wherein the rotor is connected to a rotor shaft mounted in the housing so as to be rotatable about an axis of rotation, a transmission which is rotationally drivable by the rotor shaft, at least one fluid distribution element for distributing coolant to a respective one of the winding heads, wherein the fluid distribution element at least partially covers an upper section of the winding head in the circumferential direction and in the axial direction and includes a guide structure with a gradient in the circumferential direction. Coolant supplied to the fluid distribution element can thus be distributed in the circumferential direction and flow onto the winding head in several angular positions over a circumferential area of at least 30° with respect to the axis of rotation.

Electrical machines and/or transmissions are usually cooled and/or lubricated with a coolant. A fluid, in particular an oil or an oil-containing liquid, can be used as the coolant. Where the term "oil" is used alone or in combination in the context of the present disclosure, this is intended to include any form of coolant.

An advantage of the electric drive is that, due to the fluid distribution element, it can provide reliable lubrication for an associated winding head. Cooling is therefore achieved in a space-saving and efficient manner, utilising the force of gravity. Active lubrication of the winding head using nozzles or spray heads can be dispensed with, so that the required installation space is small. Depending on the specific requirements of the overall cooling concept, one or both of the winding heads can be equipped with an associated fluid distribution element. Accordingly, all the features described below for a (or one) fluid distribution element also apply to a further fluid distribution element, which can be provided for cooling the other winding head.

A fluid distribution element can be arranged in the housing axially between the stator core and an opposite housing wall. During operation, the fluid distribution element is supplied with coolant from a feeder in the housing. The feeder can also be referred to as inlet. In the mounted condition, the mouth or opening of the feed can be located vertically above the distribution element, so that the coolant runs or flows onto the fluid distribution element due to gravity. The fluid distribution element is designed such that coolant flowing in from the feeder is distributed over an angular segment of at least 30° of the winding head and flows onto the winding head.

A fluid distribution element can extend over at least half the axial length of the winding head and/or cover it, in particular over at least ⅔ or even the entire axial length of the winding head. In this way, a correspondingly large axial portion of the winding head is supplied with cooling oil and cooled.

According to an embodiment, the fluid distribution element can have a receiving section, which is supplied with oil from the oil feed during operation, and one or more distribution sections, which are fluidically connected to the receiving section and distribute oil flowing from the receiving section in the circumferential direction and/or in the longitudinal direction. The receiving section, which can also be designated as collecting section or portion, can optionally have one or more radial openings through which the radially underlying circumferential section of the winding head can be cooled with oil.

The receiving section can be arranged centrally, from which a distribution section can extend in both circumferential directions. Overflow openings can be formed between the receiving respectively collection section and the distribution sections so that oil in the collection section is channeled through the overflows into the distribution sections. A distribution section can have one or more channels that extend from the collection section in the circumferential direction. At the end of the channels, the oil flows onto the winding head located below, respectively radially inside the distribution element.

A particularly large cooling area is covered if the fluid distribution element has a varying circumferential extension over its axial length. Accordingly, a distribution section axially adjacent to the stator core has a different circumferential length than axially remote from the stator core. In an embodiment, a distribution section can have several channels of different lengths extending in the circumferential direction. In this way, a correspondingly large circumferential segment of the winding head is supplied with cooling oil. In an embodiment, in which both winding heads are provided with a respective oil distribution element for cooling, the two elements can widen in the same or in opposite axial directions.

According to an embodiment, the at least one fluid distribution element can be designed with fixing means, in particular connecting elements, in such a way that it can be mounted axially in the housing. For this, the fluid distribution element can have several fastening portions with which it is connected in a force-locking and/or form-fitting manner to corresponding opposing retaining sections in the housing. According to an embodiment, the fluid distribution element can axially span the axial gap between a side face of the stator core and the opposite housing wall and/or be axially supported against a side face of the stator core. The fluid distribution element, which can also be referred to as an insert for distributing coolant, can be made of plastic or sheet metal, for example.

The oil feeder and the oil distribution element for stator cooling are part of a cooling circuit or cooling arrangement of the electric drive. The cooling arrangement can include an oil sump, further cooling channels and conveying means to transport and circulate coolant to the required components for heat removal and lubrication. The cooling and circulation of the coolant in the electric drive can be active and/or passive. In the case of passive cooling, the coolant is conveyed by means of rotating components of the electric drive and circulates by utilising gravity. In the case of active cooling, the coolant is conveyed and circulated by a pump. Mixed cooling can be designed such that coolant is conveyed both actively by a pump and passively by rotating components.

According to an embodiment, the cooling arrangement can be configured such that at least 10% of the circulating coolant is conveyed to the oil distribution element. This can apply to active and/or passive cooling. If the electric drive has only one oil distribution element, at least 10%, in particular at least 15%, of the coolant is conveyed to the oil distribution element. If both winding heads are cooled by a respective oil distribution element, then together at least 20%, in particular at least 25%, of the cooling volume flow can be used to cool the winding heads. This total cooling flow for the winding heads can be divided equally between the two.

A gap is formed between the stator and the rotor of the electric machine. The cooling arrangement can be designed such that the static and/or dynamic oil level in the housing is below the gap. In order to prevent oil in the working gap of the electric machine and to minimise transmission splash losses, a low oil level in the motor and/or transmission housing can be aimed for. According to an embodiment, a reservoir separate from the motor housing chamber and the transmission housing chamber can be provided within the housing. The reservoir, which can also be referred to as a tank, can be arranged laterally adjacent to the electric motor, for example.

An embodiment with a reservoir can be favourable in combination with an active cooling by a pump, with a passive cooling also being suitable. The reservoir forms a tank volume for active lubrication in the central housing, which is separated from the electrical machine and/or the transmission chamber or compartment and has its own oil level during operation. In order to keep the separate coolant levels constant during operation, the volume flow delivered from the tank volume by the hydraulic pump must also be returned to the tank. This can be achieved via a suitable return of pressurised volume flows directly into the tank and/or via unpressurised volume flows by means of suitable conveying mechanisms of the rotating components.

The reservoir is arranged and/or designed such that oil is conveyed into the reservoir by a rotating component during operation. An oil guide structure can be provided in the housing to collect oil spun off by the rotating component and channel or guide it into the reservoir. A suction opening for the pump can be arranged in the reservoir, which can also be referred to as intake. During operation, the oil level in the reservoir is above the oil level in the motor housing chamber and/or transmission housing chamber. This higher oil level above the intake point provides reliable intake and/or supply to the hydraulic oiling system even in dynamic driving conditions, such as lean angles and lateral acceleration. The reservoir can be formed by a side wall and a circumferential, flange-like wall, which is closed by a cover. The cover can include a filter element for filtering the oil and a downstream connecting element for fluidic connection to the suction opening or intake orifice. The reservoir cover can also have an oil collecting rib, which is designed to guide oil conveyed from the pump via an oil inlet into the housing to a gearing region of the transmission.

The described embodiment with reservoir and intake in the reservoir is particularly suitable for assemblies in which the intake of the active lubrication system does not allow a significant height difference to the rotating components of the electric machine and/or the transmission due to installation space restrictions. In this case, the reservoir offers a way to fulfil the requirements regarding the working gap of the electric machine and undesired splash losses on the one hand and regarding the robust suction into the lubrication system on the other hand with a common oil circuit.

The electric machine can be controlled by means of power electronics, such as a pulse inverter, with an integrated electronic control unit (ECU). The power electronics, which can also be referred to as an inverter, can be part of the electric drive. For this purpose, the housing can have a connection flange to connect the inverter. Overall, it is thus formed a motor-transmission-inverter unit. The electrical machine can be powered by a battery. The power electronics are functionally arranged between the battery and the electric machine. An inverter controls and monitors the electric machine and provides that the torque supply and speed control of the drivetrain are in line with requirements. When the electric motor is operating in motor mode, the inverter supplies the electric motor with power from the battery. If the electric machine is working in generator mode, the inverter feeds power into the battery. In this process, known as recuperation, the inverter converts the alternating current (AC) generated by the electric motor into direct current (DC) and thus charges the battery. In motor mode, the inverter converts the battery's DC voltage into the AC voltage required for the electric motor.

BRIEF SUMMARY OF THE DRAWINGS

An exemplary embodiment is explained below with reference to the drawing figures.

FIG. 9 shows the cover of the transmission from FIG. 8A in a front diagonal perspective view from.

DESCRIPTION

Figure 1:
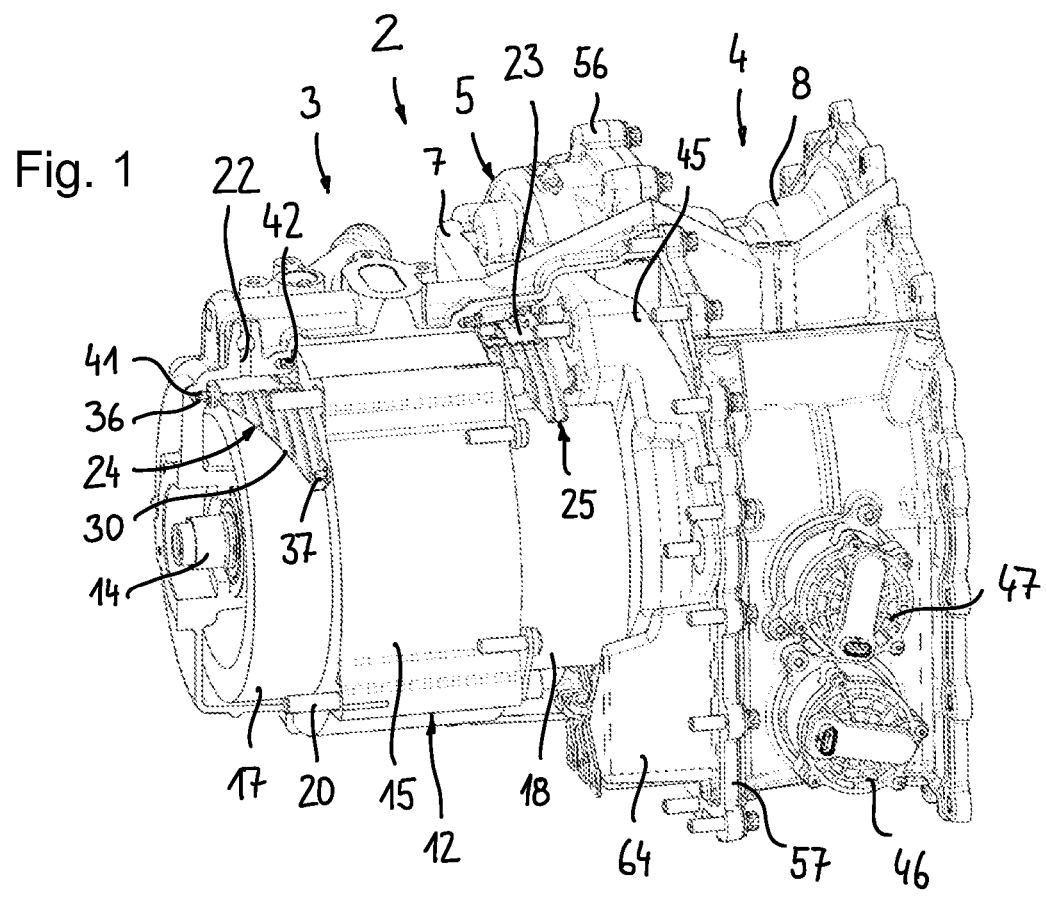
FIG. 1 shows an example electric drive assembly with an electric machine and a transmission, with a partially cut housing.
Figure 2:
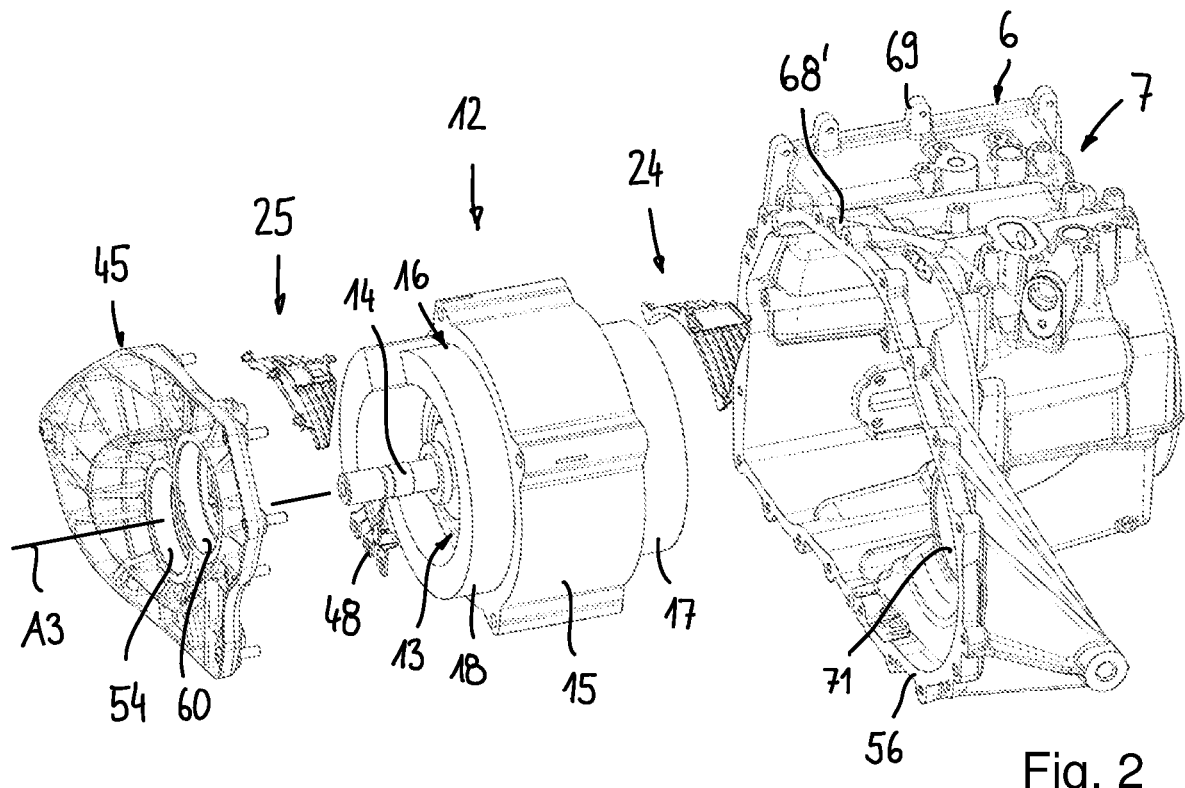
FIG. 2 shows an exploded view of the electrical machine of FIG. 1.

FIGS. 1 to 9B are described together below. An example electric drive assembly 2 is shown, which can also be as an electric drive. The electric drive assembly 2 comprises an electric machine 3 and a transmission 4, which is drivingly connected to the electric machine 3. The transmission 4 translates a rotary motion initiated by the electric machine 3, including into a slow motion, and can transmit the rotary motion to a downstream side shaft of the motor vehicle (not shown). The electric motor 3 and the transmission 4 are accommodated in a housing assembly 5, which can also be referred to as the housing.

The electric machine 3 serves as a drive source for driving a drive axle of a motor vehicle. The electric machine 3 can be controlled by means of power electronics, such as a pulse inverter, with an integrated electronic control unit (ECU). The electrical connection to the power electronics is made via an electrical connection 48. The power electronics (not shown) can optionally be attached to a connection portion 6 of the housing assembly 5. The electrical machine 3 is to be connected to a battery (not shown) for the power supply.

The housing can be provided in several parts, i.e. as multi-part housing, and comprise a motor housing part 7 and a transmission housing part 8, which can be connected to each other, for example via a flange connection 9 via bolts, with other options such as welding also being possible.

The electric machine 3 has a stator 12, which is firmly connected to the housing 8, and a rotor 13, which is firmly connected to a rotor shaft 14 for transmitting torque. The rotor shaft 14 is mounted in the motor housing so as to be rotatable about an axis of rotation A3. The electrical machine 3 be configured in the form of an asynchronous machine or synchronous machine. The stator 12 has a stator core 15 and windings 16 whose winding heads 17, 18 project axially beyond the stator core on both sides. The stator core 15 can comprise a laminated core which can optionally comprise circumferentially distributed through-holes 19 and can be axially clamped to the housing by clamping screws 20.

Figures 3, 4, 5:
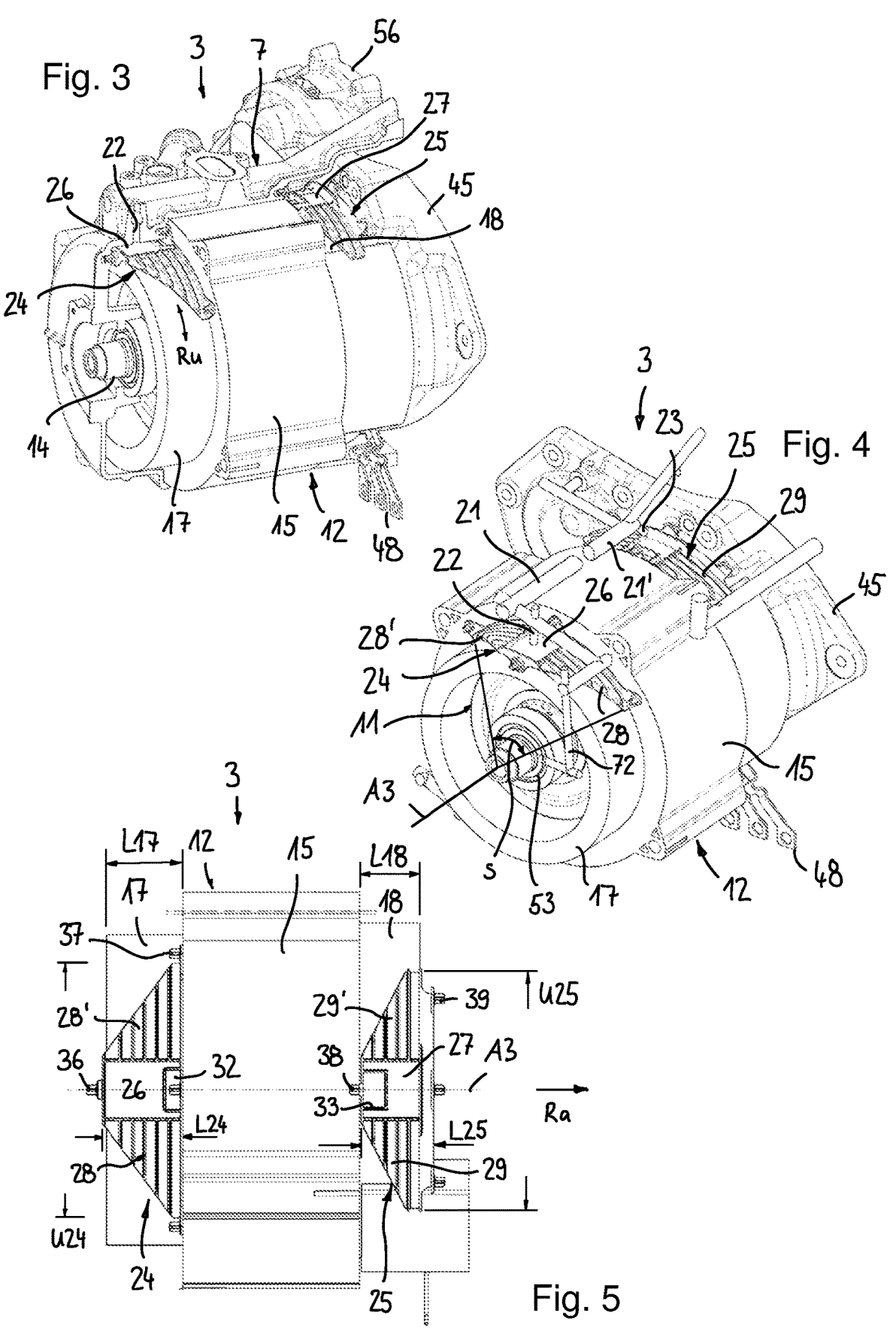
FIG. 3 shows a perspective view of the electrical machine from FIGS. 1 and 2, with a partially cut housing.
FIG. 4 shows the electrical machine from FIGS. 1 and 2 with the cooling channels shown and the housing cut away.
FIG. 5 shows the electrical machine from FIGS. 1 and 2 as a detail with fluid distribution elements in a radial view.

The present electric drive assembly 2 has a special design for the cooling of the electric machine 3. For this purpose, the assembly has a cooling system for each winding head 17, 18 with a coolant feeder 22, 23 in the housing 5 and an associated fluid distribution element 24, 25, which distributes the supplied coolant over a larger area. A fluid, e.g., an oil or an oil-containing liquid, is used as the coolant. The feeder 22, 23, which can also be designated as supplies or inlets, and the fluid distribution elements 24, 25 for stator cooling are part of a cooling circuit of the electric drive. FIG. 4 shows further cooling lines 21, 21' which lead to the feeder 22, 23, as well as cooling line 72, which leads to the bearing 53 to cool same. The cooling lines can be formed in the housing and can also be referred to as conduits or channels.

The two fluid distribution elements 24, 25 have the same design and function. Only one of the two elements can be described as representative of both, wherein the features described also apply to the other. The fluid distribution elements 24, 25 are arranged in the housing 5 above the winding heads 17, 18 and/or axially between the stator core 15 and a housing wall 26, 27 axially opposite thereto. The type of attachment of the fluid distribution elements 24, 25 can be selected as desired, for example form-fit, force-fit and/or material connection.

The fluid distribution elements 24, 25 are designed and arranged such that they at least partially cover an upper section and/or segment of the winding head 17, 18 in the circumferential direction and in the axial direction. The fluid distribution elements 24, 25 distribute the coolant flowing in from the feed 22, 23 over an angular segment s of preferably at least 30° with respect to the axis of rotation A3 and/or over a length L24, L25 of at least half the axial length L17, L18 of the associated winding head 17, 18. The distribution of the coolant flowing in is effected solely by gravity; nozzles or the like are not required. In this way, a relatively large circumferential area of the winding heads 17, 18 is effectively cooled without additional means.

Figure 6:
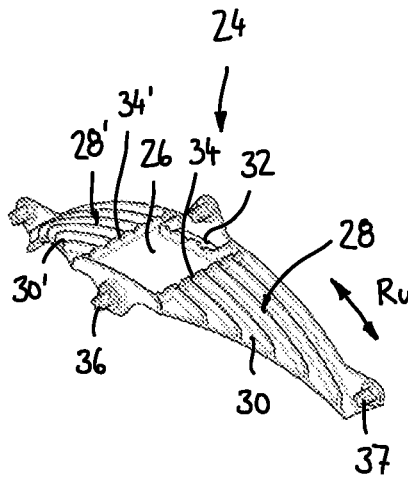
FIG. 6 shows a first fluid distribution element of the electric drive from FIG. 1 in a perspective view from diagonally in front.
Figure 7:
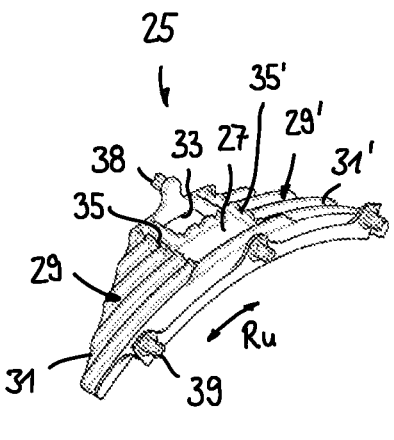
FIG. 7 shows a second fluid distribution element of the electric drive from FIG. 1 in a perspective view from diagonally behind.

As can be seen from FIGS. 6 and 7, the fluid distribution elements 24, 25 can each have a receiving section 26, 27 and distribution sections 28, 28'; 29, 29' fluidically connected therewith. During operation of the assembly, coolant flows from the oil supply 22, 23 into the associated receiving section 26, 27, from where it runs to the distribution sections and is distributed over a larger area due to gravity and then runs or flows onto the winding heads 17, 18. The receiving sections 26, 27 can be designed to receive and temporarily gather coolant before it flows further downwards. Thus, they can also be designated collecting portions or sections.

The receiving sections 26, 27 can optionally have a radial through opening 32, 33, through which part of the supplied coolant can flow directly to cool the radially underlying section of the winding head 17, 18 and cool same. The receiving section 26, 27 is arranged in the centre without being restricted thereto. A distribution section 28, 28'; 29, 29' extends on either side of the receiving section 26, 27 in the circumferential direction. The distribution sections each have a plurality of channels 30, 31 which extend from the receiving section in the circumferential direction and each have an open end from where the coolant flows downwards onto the winding head 17, 18 located radially below. Overflow openings 34, 35 can optionally be formed between the receiving section 26, 27 and the distribution sections 28, 28'; 29, 29'. The overflow openings facilitate a targeted coolant supply into all channels 30, 31, so that uniform cooling is achieved over the winding heads 17, 18 located below.

In the present embodiment, the fluid distribution elements 24, 25 each have a variable circumferential extension U24, U25 over their axial length L24, L25, although other embodiments with the same circumferential extension are also possible. It can be seen in FIG. 5 that the distribution sections 28, 28'; 29, 29' have a different circumferential length axially adjacent to the stator core 12 than axially remote from the stator core. In particular, the fluid distribution elements 24, 25 are approximately V-shaped when viewed in radial direction. Due to the V-shaped design, the channels 30, 31 have different circumferential lengths. In this way, a correspondingly large circumferential segment of the respective winding head 17, 18 is supplied with cooling oil. In the present embodiment, both fluid distribution elements 24, 25 widen in the same axial direction Ra. The circumferential extension (circumferential angle s) of the fluid distribution elements 24, 25 can, for example, be between 30° and 180° with respect to the axis of rotation A3.

The fluid distribution elements 24, 25 each have connecting elements 36, 37, 38, 39 with which they are axially mounted or fastened in the housing 5. For example, the fluid distribution element 24 has a connecting element 36 on the circumferentially short side and several connecting elements 37 on the circumferentially long side. The connecting elements 36, 37, which can also be referred to as fastening elements, are designed such that they can engage in corresponding retaining portions 41, 42 in the housing 5 in a force-locking and/or form-locking manner. The fluid distribution element 24 can be axially supported against the side face of the stator core 15 and can span the axial gap between the stator core and the opposite housing wall. The second fluid distribution element 25, which can be supported with its short end on the opposite side of the stator, is axially fixed between the motor housing 45 and the intermediate wall 45 by the connecting elements 38, 39. For this, the motor housing 45 and intermediate wall 45 have corresponding retaining portions 43, 44, which can be configured in the form of bores and can also be designated holding portions. The fluid distribution elements 24, 25 can be made of plastic or sheet metal.

During operation, the coolant K runs over the winding heads 14, 15 and reaches the oil sump S5 of the housing 5.

From here, the coolant K is circulated again, wherein the cooling system has a conveyer, such as a pump, and further cooling channels in order to transport and circulate the coolant K to the required components for heat removal and lubrication. The cooling system can be designed such that at least 20% of the circulating coolant K is conveyed to the two fluid distribution elements 24, 25, i.e. at least 10% per fluid distribution element. The remaining circulating coolant flow is distributed to supply the bearings and seals, the stator core 15, the rotor 13 and possibly one or more pairs of gears. A heat exchanger can be arranged in the flow path downstream of the pump to cool down the heated oil in the return flow.

Figures 8A, 8B, 8C, 8D:
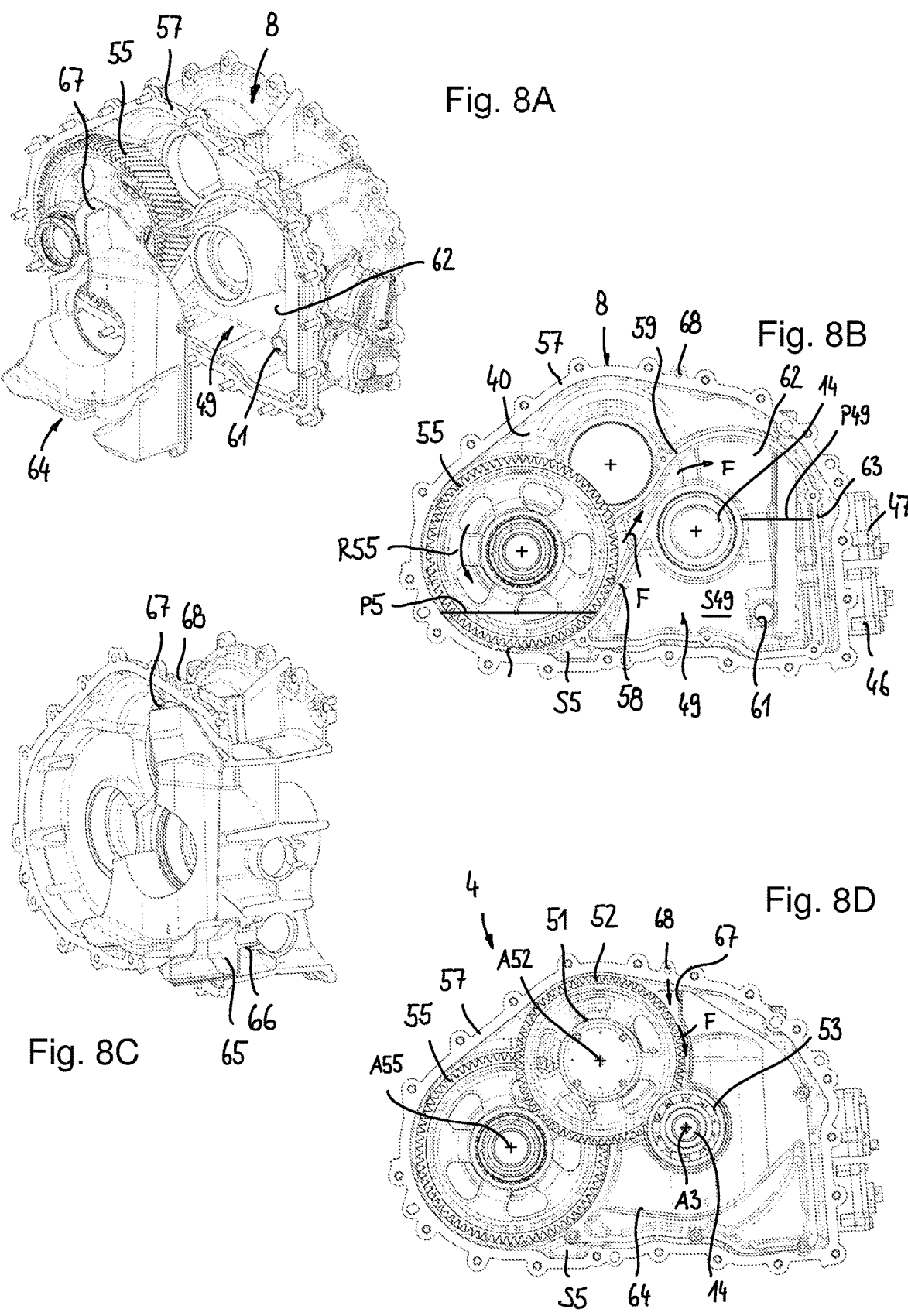
FIG. 8A shows an axial view of the transmission of the electric drive assembly from FIG. 1.
FIG. 8B shows a perspective view of part of the transmission from FIG. 8A.
FIG. 8C shows an axial view of the assembly shown in FIG. 8B without the cover.
FIG. 8D shows a perspective view of the transmission housing from FIG. 8C with a cover according to section C-C.

FIGS. 8A to 8D, collectively referred to herein as FIG. 8, show the transmission 4. The multi-part housing 5 comprises a transmission housing chamber 40, in which the transmission 4 is accommodated, and a motor housing chamber 50, in which the electric machine 3 is accommodated. The transmission housing 8 has a connecting flange 57, which is to be connected to the opposing connecting flange 56 of the motor housing 7. The transmission 4 is configured as a gear transmission and comprises several meshing pairs of gears. Thus, it can also be referred to as gearing or gearbox. It is understood that the transmission and housing can be designed according to the technical requirements, such as the torque to be transmitted, speeds, installation space, and can accordingly also have designs other than those shown here.

In the present embodiment, the transmission 4 comprises a first pair of gears with a pinion connected to the rotor shaft 14 and a gear 52 meshing therewith. In the assembled state, the rotor shaft 14 is mounted at one end by the bearing 53 in the bearing seat 54 of the intermediate wall 45 so as to be rotatable about the axis of rotation A3. A second pair of gears comprises an intermediate gear, which via an intermediate shaft is connected to the gear 52 in a rotationally fixed manner, and a gear 55, which can also be referred to as an output gear. The intermediate shaft is rotatably mounted about the axis of rotation A52 by a bearing 51 in the bearing seat 60 of the intermediate wall 45. The gear 55 is rotatably mounted about the axis of rotation A55 by a bearing 70 in the bearing seat 71 of the motor housing 7. The axis of rotation A55 of the output gear can be located slightly below and the axis of rotation A52 of the intermediate shaft can be located slightly above the axis of rotation A3 of the electric machine 3.

A further feature of the present electric drive assembly 2 is that it comprises both active and passive coolant supply system, without being limited thereto. A passive coolant supply is formed by a rotating component, e.g., a gear, which delivers coolant from the oil sump S5 into a separate reservoir 49. A hydraulic pump (not shown) is also provided, the suction side of which is located in reservoir 49, from which the pump recirculates the coolant. The suction-side hydraulic connection 46 to the pump and the pressure-side hydraulic connection 47 back into the cooling system are located on the transmission housing 8.

A gap 11 is formed between the stator 12 and the rotor 13 of the electric machine 3. In particular, the cooling arrangement is designed such that the oil level P5 in the motor housing 7 and/or in the transmission housing 8 is below the gap 11 of the electric machine during operation. A reservoir 49 is provided inside the housing 5, separated from the motor housing chamber 50 and the transmission housing chamber 30. The reservoir 49 is arranged axially in a connecting region between the transmission housing and the motor housing, in particular axially adjacent to the electrical machine 3.

The reservoir 49 forms a separate tank volume in the housing 5 for active lubrication. The reservoir is separated from the motor chamber or compartment and the transmission chamber or compartment and has its own oil level P49 during operation. In order to maintain the separate coolant levels P5 and P49 at a constant level during operation, the volume flow delivered from the tank volume by the hydraulic pump must also be returned to the tank. This can be achieved via a suitable return of pressurised volume flows directly into the tank and/or via unpressurised volume flows by suitable supply or delivery mechanisms of the rotating components.

It can be seen in FIG. 8C that the reservoir 49 is arranged and/or designed such that coolant K is conveyed into the reservoir 49 by the rotating gear 52 during operation. An oil guide structure 58, 59 is provided in the housing 5 in order to collect oil thrown off by the gear 52 and direct it into the reservoir. The rotational movement of the gear 55 is marked R55, and the direction of flow of the coolant K is marked F. The suction opening 61 for the pump is located in the reservoir 49. During operation, the oil level P49 in the reservoir is above the oil level P5 in the motor housing chamber and/or transmission housing chamber. The oil level P49 above the intake point provides reliable intake and supply of coolant to the hydraulic oiling system even under dynamic driving conditions.

Figure 9A:
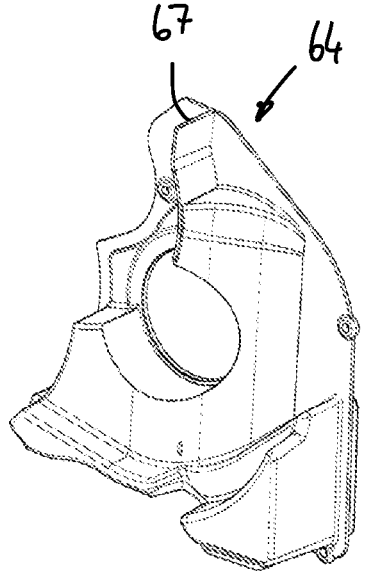
Figure 9B:
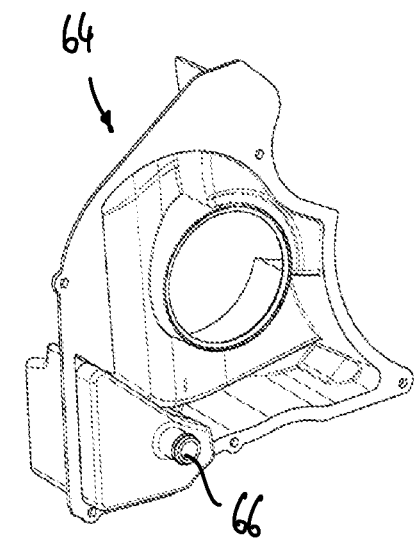
FIG. 9B shows the cover of the transmission from FIG. 8A in a rear diagonal perspective view.

The reservoir 49 is formed by the side wall 62 of the transmission housing 8, a circumferential, flange-like wall 63 and a cover 64, which is shown as a detail in FIGS. 9A and 9B. The cover 64 comprises a filter element 65 for filtering the oil upstream of the return flow and a downstream connecting element 66 for fluidic connection to the intake opening 61. The cover also has an oil catch rib 67, which is designed to guide oil conveyed from the pump via an oil inlet channel 68, 68' into the housing 5 to a meshing region of the gear 52 with the drive pinion.

The electric machine 3 can be controlled by power electronics (not shown). The power electronics can be connected to the housing 5 via the connection flange 69. The electrical machine 3 can be powered by a battery.

LIST OF REFERENCE SYMBOLS 2 electric drive assembly
3 electric machine
4 transmission
5 housing
6 connecting portion
7 motor housing part
8 transmission housing part
9 flange connection
12 stator
13 rotor
14 rotor shaft
15 stator core
16 windings
17 winding head
18 winding head
19 through hole
21,21' line
22 feed
23 feed
24 fluid distribution element
25 fluid distribution element
26 receiving section
27 receiving section
28, 28' distribution section 29, 29' distribution section
30 channel
31 channel
32 through opening
33 through opening
34, 34' overflow opening
35,35' overflow opening
36, 37 connecting elements
38, 39 connecting elements
40 transmission housing chamber
41 holding portion
42 holding portion
43 holding portion
44 holding portion
45 intermediate wall
46 hydraulic connection
47 hydraulic connection
48 electrical connection
49 reservoir
50 motor chamber
51 bearing
52 gear
53 bearing
54 bearing seat
55 gear
56 connecting flange
57 connecting flange
58 oil guiding structure
59 oil guiding structure
60 bearing seat
61 intake opening
62 side wall
63 wall
64 cover
65 filter element
66 connecting element
67 oil catching rib
68, 68' oil supply channel
69 connecting flange
70 bearing
71 bearing seat
72 cooling line
A axis of rotation
F flow direction
K coolant
L length
P dynamic coolant level
R direction
S coolant sump
s angle range
U circumferential extension

The invention claimed is:

1. An electric drive assembly for driving a motor vehicle, comprising:
a multi-part housing,
an electrical machine with a stator and a rotor, wherein the stator is accommodated in the housing in a rotationally fixed manner and includes a stator core and windings with winding heads projecting axially beyond sides of the stator core, wherein the rotor is connected to a rotor shaft which is mounted in the housing so as to be rotatable about an axis of rotation,
a transmission that is rotatably drivable by the rotor shaft and is configured to translate a rotary motion introduced by the electric machine to a reduced speed,
a fluid distribution element for supplying coolant to one of the winding heads by using gravity, wherein the fluid distribution element at least partially covers an upper section of the winding head in a circumferential direction and in an axial direction, and comprises a guide structure with a gradient in the circumferential direction, so that coolant supplied to the fluid distribution element from above is distributed in the circumferential direction and flows onto the winding head in several angular regions over a circumferential area of at least 30° of the axis of rotation, wherein the fluid distribution element has a varying circumferential extension over an axial length thereof, so that one of the distribution sections has a different circumferential extension axially adjacent to the stator core than axially remote from the stator core.

2. The electric drive assembly according to claim 1, wherein a feeder is provided in the housing, via which the fluid distribution element is supplied with coolant during operation, with the fluid distribution element being arranged at a distance vertically below the feeder.

3. The electric drive assembly according to claim 1, wherein the fluid distribution element extends over at least half an axial length of the winding head.

4. The electric drive assembly according to claim 2, wherein the fluid distribution element includes a receiving section, which is supplied with coolant from the feeder during operation, and distribution sections, which are fluidically connected to the receiving section and distribute coolant flowing from the receiving section in the circumferential direction.

5. The electric drive assembly according to claim 4, wherein the receiving section has at least one radial through-opening.

6. The electric drive assembly according to claim 4, wherein the distribution sections have a plurality of channels of different lengths extending in the circumferential direction.

7. The electric drive assembly according to claim 1, wherein the fluid distribution element is mounted axially in the housing and comprises connecting elements with which the fluid distribution element is form-fittingly connected in the housing.

8. The electric drive assembly according to claim 1, wherein one of the fluid distribution element is provided at each of the winding heads of the stator, wherein the fluid distribution elements at each of the winding heads widening in a same axial direction in the circumferential direction.

9. The electric drive assembly according to claim 1, wherein the fluid distribution element for cooling the stator is part of a cooling system with a coolant sump and a pump.

10. The electric drive assembly according to claim 9, wherein the cooling system is configured such that at least 10% of a circulating coolant is conveyed to the fluid distribution element.

11. The electric drive assembly according to claim 1, wherein a gap is formed between the stator and the rotor, wherein at least one of a static or dynamic coolant level in the housing is below the gap.

12. The electric drive assembly according to claim 1, wherein a reservoir is provided within the housing, with the reservoir being separate from a motor housing chamber and from a transmission housing chamber, with the reservoir configured to receive coolant during operation and a suction opening for the pump arranged in the reservoir, wherein a coolant level in the reservoir is above the coolant level of at least one of the motor housing chamber or the transmission housing chamber during operation.

13. The electric drive assembly according to claim 12, wherein a fluid guiding structure is provided in the housing, which is designed to collect coolant thrown off by a rotating component of the electric drive during operation and to direct it into the reservoir.

14. The electric drive assembly according to claim 12, wherein the reservoir is closed by a reservoir cover, the reservoir cover having a filter element and a connecting element which is connected to the suction opening.

15. The electric drive assembly according to claim 14, wherein the reservoir cover has a coolant catching rib which is designed to guide coolant conveyed from the pump via an oil inlet into the housing to a gearing region of the transmission.

16. An electric drive assembly for driving a motor vehicle, comprising:

a multi-part housing, an electrical machine with a stator and a rotor, wherein the stator is accommodated in the housing in a rotationally fixed manner and includes a stator core and windings with winding heads projecting axially beyond sides of the stator core, wherein the rotor is connected to a rotor shaft which is mounted in the housing so as to be rotatable about an axis of rotation, a transmission that is rotatably drivable by the rotor shaft and is configured to translate a rotary motion introduced by the electric machine to a reduced speed, a fluid distribution element for supplying coolant to one of the winding heads by using gravity, wherein the fluid distribution element at least partially covers an upper section of the winding head in a circumferential direction and in an axial direction, and comprises a guide structure with a gradient in the circumferential direction, so that coolant supplied to the fluid distribution element from above is distributed in the circumferential direction and flows onto the winding head in several angular regions over a circumferential area of at least 30° of the axis of rotation, wherein a reservoir is provided within the housing, with the reservoir being separate from a motor housing chamber and from a transmission housing chamber, with the reservoir configured to receive coolant during operation and a suction opening for the pump arranged in the reservoir, wherein a coolant level in the reservoir is above the coolant level of at least one of the motor housing chamber or the transmission housing chamber during operation, wherein the reservoir is closed by a reservoir cover, the reservoir cover having a filter element and a connecting element which is connected to the suction opening.

17. The electric drive assembly according to claim 16, wherein the reservoir cover has a coolant catching rib which is designed to guide coolant conveyed from the pump via an oil inlet into the housing to a gearing region of the transmission.

* * * * *